(12) United States Patent
Kroll et al.

(10) Patent No.: US 6,560,974 B2
(45) Date of Patent: May 13, 2003

(54) NITROGEN-BASED REFRIGERATOR CRISPER

(76) Inventors: Mark W. Kroll, 493 Sinaloa Rd., Simi Valley, CA (US) 93065; Thorstein Holt, 1801 Grayson Ridge Ct., Chesterfield, MO (US) 63017

( * ) Notice: Subject to any disclaimer, the term of this patent is extended or adjusted under 35 U.S.C. 154(b) by 0 days.

(21) Appl. No.: 09/951,812

(22) Filed: Sep. 11, 2001

(65) Prior Publication Data

US 2002/0033023 A1 Mar. 21, 2002

Related U.S. Application Data

(60) Provisional application No. 60/233,732, filed on Sep. 19, 2000.

(51) Int. Cl.[7] .............................. F24F 3/16; F25D 17/00
(52) U.S. Cl. ............................................. 62/78; 62/179
(58) Field of Search ............................ 62/78, 91, 382, 62/373, 376, 441, 179, 48.1

(56) References Cited

U.S. PATENT DOCUMENTS

| | | | |
|---|---|---|---|
| 3,937,847 A | * 2/1976 | Elkins et al. | 62/78 X |
| 4,013,434 A | 3/1977 | Kronenberger et al. | |
| 4,061,483 A | 12/1977 | Burg | |
| 4,142,372 A | * 3/1979 | Kato et al. | 62/78 |
| 4,754,611 A | 7/1988 | Hosaka et al. | |
| 4,860,555 A | 8/1989 | Bishop et al. | |
| 4,961,322 A | * 10/1990 | Oguma et al. | 62/179 |
| 5,063,753 A | * 11/1991 | Woodruff | 62/78 X |
| 5,284,871 A | 2/1994 | Graf | |
| 5,303,563 A | 4/1994 | Bishop et al. | |
| 5,417,080 A | 5/1995 | Bishop | |
| 6,113,962 A | 9/2000 | Spencer | |

FOREIGN PATENT DOCUMENTS

| | | | |
|---|---|---|---|
| CN | 1218172 A | * | 6/1999 |
| CN | 1225253 A | * | 8/1999 |
| JP | 402203185 A | * | 8/1990 |
| JP | 03091680 A | * | 4/1991 |
| JP | 05005585 A | * | 1/1993 |

* cited by examiner

*Primary Examiner*—Chen Wen Jiang

(57) ABSTRACT

A refrigerator crisper drawer based on an increased nitrogen concentration. This nitrogen concentration necessarily depletes the oxygen thus reducing the opportunities for food to oxidize or "brown."

2 Claims, 2 Drawing Sheets

NITROGEN-BASED REFRIGERATOR CRISPER

This invention is based upon provisional application No. 60/233,732 filed on Sep. 19, 2000 for Hypoxic Refrigerator Crisper.

BACKGROUND OF THE INVENTION

As it is well known, open food stuffs deteriorate in a refrigerator. In spite of the fact that the cold temperature slows down bacterial growth. This decay is primarily based on two factors. The first is low or high humidity, which causes foods to dehydrate (low humidity) or have mold growth (high humidity). The second problem is the oxygen in the environment, which leads to oxidation of the foods.

The first problem is dealt with the conventional refrigerator crisper which (theoretically) maintains an optimal humidity in the crisper drawer that assists with the problem of dehydration and mold formation. However, the oxygen concentration in that drawer is essentially equal to that of room air and therefore the oxidation is not retarded. The oxidation of the food, which is the same chemical reaction as occurs with rust often leads to a browning color just like rust. This is seen most rapidly on cut fruits and vegetables such as lettuce cut in half or a sliced apple.

Burg (U.S. Pat. No. 4,061,483) teaches that low temperature, low pressure storage of food. Spencer (U.S. Pat. No. 6,113,962) teaches a process of packaging meat in noble gases. Graf (U.S. Pat. No. 5,284,871) teaches the placement of an oxygen scavenging composition in a package with food. Both Spencer and Graf deal with the package that the food is sold in. Hosaka (U.S. Pat. No. 4,754,611) teaches a refrigerator with carbon dioxide concentration. Bishop (U.S. Pat. No. 5,417,080) teaches a crisper with a mist sprayer. Kronenberger (U.S. Pat. No. 4,013,434) teaches a crisper with moveable vents for the adjustment of the humidity level. Bishop (U.S. Pat. No. 5,303,563) also teaches a vegetable crisper sprayer as done in Bishop (U.S. Pat. No. 4,860,555).

The use of controlled atmospheres for storage of fruits and vegetables is known for professional food processing facilities. For example Storage Control Systems, Inc. distributes fruit and vegetable storage system, which control the levels of carbon dioxide, nitrogen, humidity, and ethylene gases. They are located at www.storagecontrol.com. BOC Gases Division located at www.boc.com manufactures large systems that control carbon dioxide and nitrogen levels as well as the temperatures for the freezing of vegetables. In spite of the fact that the obvious benefit of controlled atmosphere for the storage of foods in refrigerators as shown by the uses in industry, no practical consumer unit has been taught in a scientific or patent literature to the best of the knowledge of the inventors.

SUMMARY OF THE INVENTION AND DETAILED DESCRIPTION OF THE PREFERRED EMBODIMENT

Figure 1:
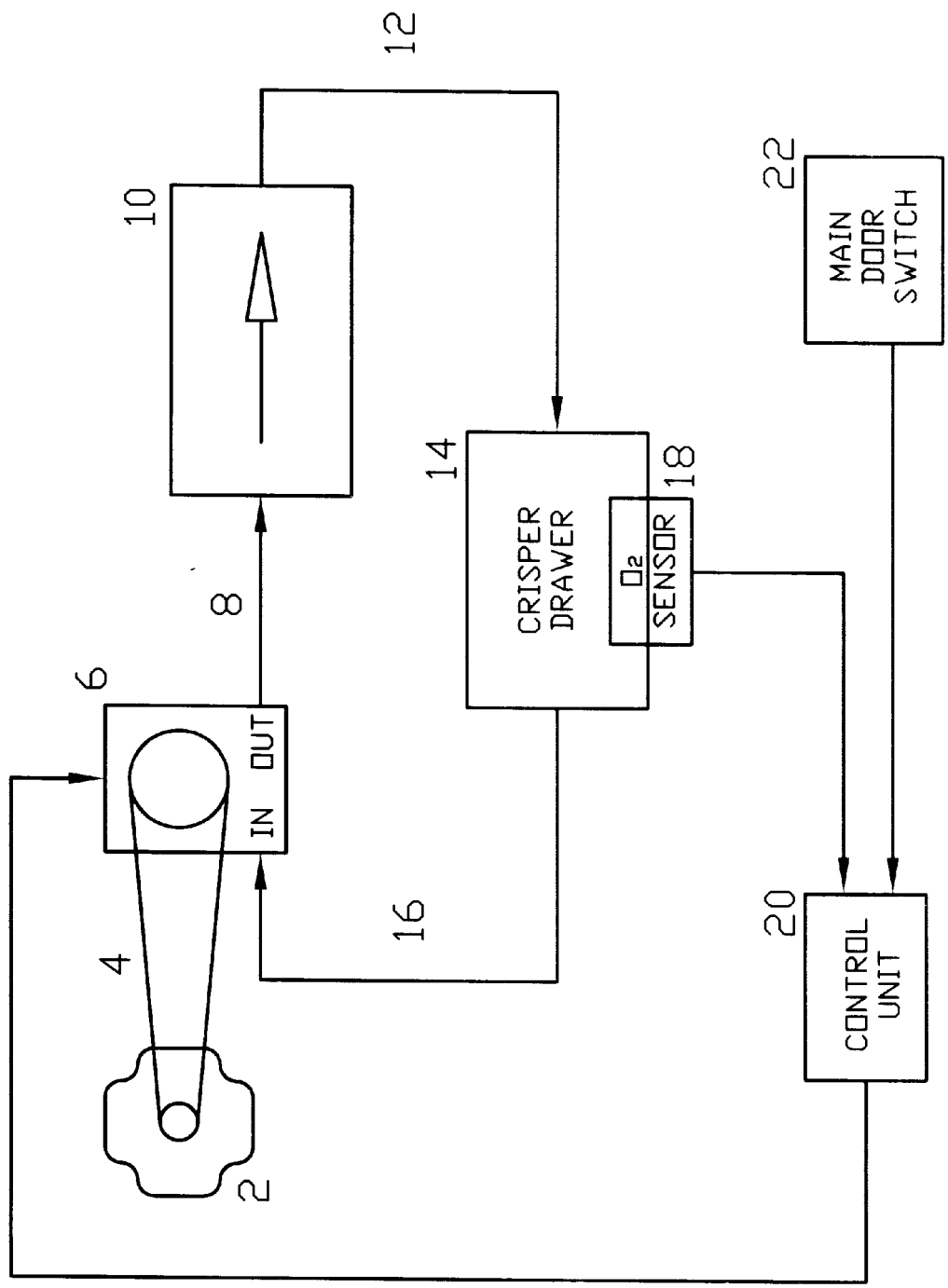
FIG. 1 shows an embodiment of the invention using a selective membrane concentrator.

FIG. 1 shows the embodiment using the existing refrigerator compressor motor, a membrane nitrogen concentrator and an oxygen sensor in the crisper drawer for optimum efficiency.

The refrigerator has a compressor motor 2, which is used for the source of power that is connected by the V-belt 4 to the air pump 6. The output of the air pump 8 goes to the selective membrane nitrogen concentrator 10. Suitable nitrogen membrane concentrators are available from the Air Products Company of St. Louis, Mo.

Higher pressure air with the increased concentration of nitrogen goes via the hose 12 into the crisper drawer 14. The output of the crisper drawer is carried by hose 16 back to the air pump 6. In this way the nitrogen concentration is gradually increased in the crisper drawer. When the concentration of the nitrogen rises significantly above the normal 78% atmospheric level than the oxygen concentration begins to approach 0. This will retard oxidation, which causes the browning.

Oxygen sensor 18 is used to detect when the oxygen concentration is below 2%. It is known that oxygen concentration reductions to below 3% are sufficient to retard browning. Alternatively the setting could be customer set anywhere from 0.1% to 10% as it allows a trade off between the power consumption and browning retardation. When the oxygen sensor is triggered then it signals a control unit 20, which will disengage the V-belt and let the air pump 6 go into the idle mode.

To avoid the cycling of the nitrogen concentrator during times the main door is open and to minimize the risk of reducing the oxygen concentration in a small kitchen, the control unit can also monitor the main door 22. Thus the air pump would not be cycled when the door switch is open.

Figure 2:
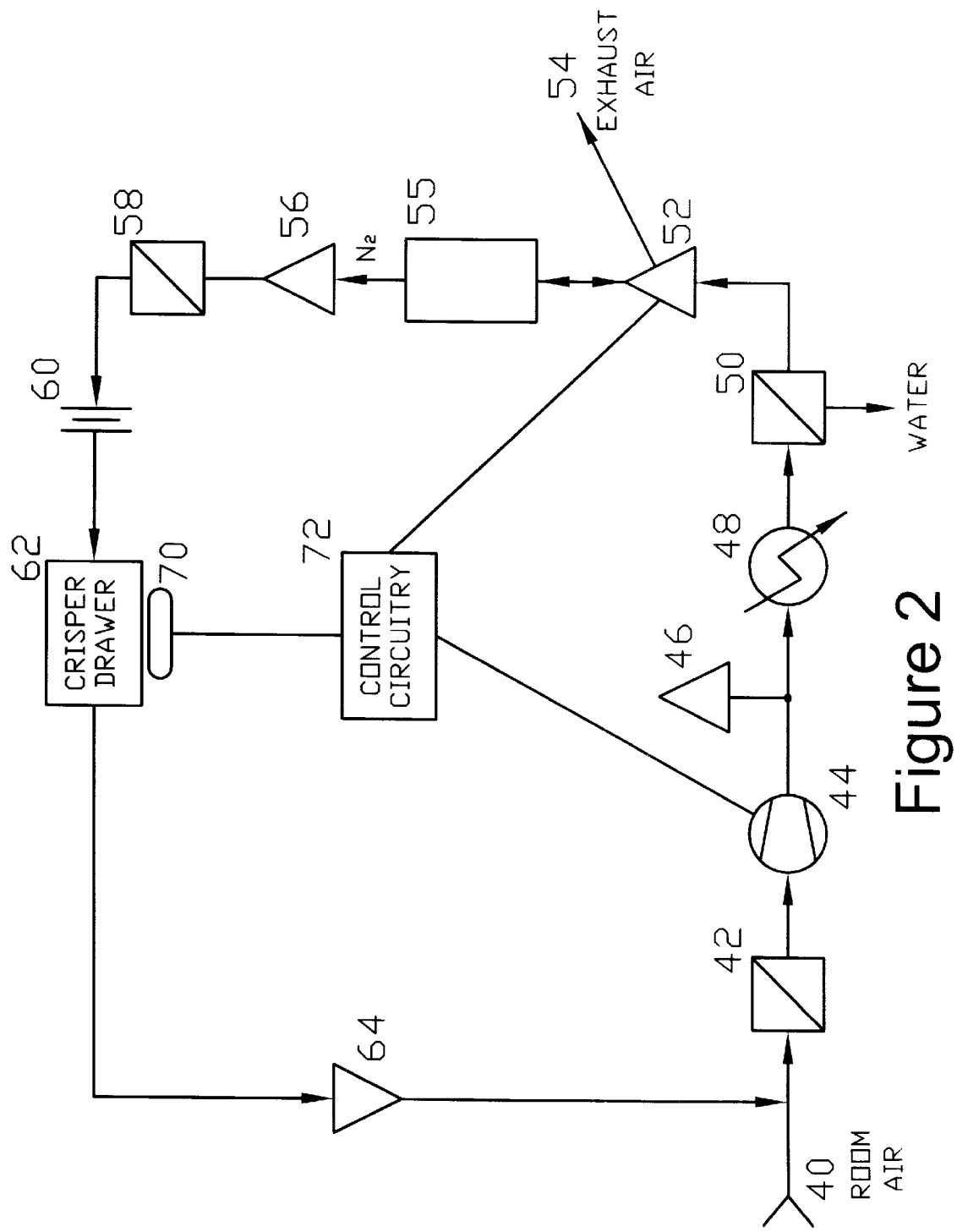
FIG. 2 shows an embodiment of the invention using a pressure swing adsorption concentrator.

FIG. 2 shows the embodiment using the pressure swing adsorption nitrogen concentrator. With this design room air is brought in through 40 and passes through the feed air filter 42 to remove dust and other particles in the air. A feed air compressor 44 then compresses this filtered air up to about 100 psig. A pressure safety valve 46 is attached to the output line from the compressor to ensure that the system cannot rupture in case of the compressor overrunning. The compressed air is then cooled in an air cooled heat exchanger 48 to achieve optimum process air temperature and to avoid adding unnecessary heat to the refrigerator.

Condensed water is removed in a filter 50 since this is beneficial to the adsorption process. A three-way solenoid valve 52 directs air to the adsorber vessel 55 and (upon control command) allows the escape of the oxygen enriched air from the adsorber vessel 55. The adsorber vessel 55 is typically filled with a desiccant material for removal of L water vapor followed by a carbon molecular sieve material that adsorbs oxygen faster than nitrogen. Air enters the adsorber vessel at the lower end and oxygen is trapped in the carbon molecular sieve material allowing nitrogen to exit the adsorber vessel at the opposite end. Nitrogen is typically produced for a period of 60 to 300 seconds depending upon the purity, flow and amount of carbon molecular sieve used. After this nitrogen production period then the regeneration process is performed. This is done for about 30 to 120 seconds.

Triggering a three-way solenoid valve 52 will allow the oxygen enriched air from the adsorber vessel 55 to exhaust air vent 54. Check valve 56 restricts the flow of the air from the crisper back out during the regeneration process. The nitrogen flow and purity is controlled by restriction orifice 60. The maintains the back pressure in the adsorber vessel. A nitrogen filter 58 is included for removal of carbon dust before the nitrogen enters the crisper 62. The nitrogen product enters the crisper at the opposite end of the nitrogen discharge line. A check valve 64 is installed in the discharge line to prevent air from entering the crisper and to prevent the crisper from over pressurization. The discharge line is connected to the suction of the air compressor. The compressor suction does therefore contain less than the 21% oxygen present in ambient air making the nitrogen generation process more efficient and reducing the time it takes to achieve low oxygen content in the crisper. Suitable compressors are available from: Thomas Industries Inc., 1419 Illinois Ave., Sheboygan, Wis. and Gast Mfg. Inc., A Unit Of IDEX Corp., 2300 Hwy. M-139 P.O. Box 97-T, Benton Harbor, Mich.

The controller circuitry 72 reads the crisper drawer switch 70 to start the nitrogen generation once the crisper drawer is inserted in the refrigerator as sensed by the position switch 70. The nitrogen generation system will be operated for pre-set time typically between 1 and 8 hours after the crisper has been inserted into the refrigerator. The operating time may be increased for a larger crisper size or reduced desired level of oxygen. The control system will also control when the nitrogen generator produces nitrogen and when regeneration of the absorption vessel takes place through the controls of the compressor 44 and the three-way valve 52.

Elements of the embodiments shown in FIG. 1 and FIG. 2 could be combined for further hybrid embodiments. For example one could use the idea of stealing power from the refrigerator compressor motor as is shown in FIG. 1 along with the pressure swing adsorption technique as shown in FIG. 2. Further one could adapt the oxygen sensor shown in the FIG. 1 embodiment to be used in the FIG. 2 embodiment. Also one could use the crisper drawer switch shown in the FIG. 2 embodiment to further refine the control in the embodiment of FIG. 1. As another example one could use the main door switch shown in the FIG. 1 embodiment to further refine the control in the FIG. 2 embodiment.

The pressure swing adsorption nitrogen concentrator process is used for separating nitrogen-enriched gas from a feed mixture containing at least oxygen and nitrogen using one or more beds of an adsorbent such as carbon molecular sieve that preferentially adsorb oxygen more rapidly than nitrogen. A suitable carbon molecular sieve is made by CarboTech of Germany. The heat exchanger is preferably a coil of about 10 turns of ⅛–¼" copper tubing with the resulting coil having a 1–1.5" diameter.

As an alternative embodiment a humidification stage could be added in line after the chamber 55 and before the crisper drawer 62. This would allow for the optimal humidification along with the lower oxygen levels for maximum food longevity.

We claim:

1. A method of preserving food in a refrigerator comprising the steps of introducing the food into a predetermined drawer, sensing the position of the predetermined drawer, and depending on that position, increasing the concentration of nitrogen from the atmosphere thus decreasing the concentration of oxygen and introducing that nitrogen-concentrated air into the predetermined drawer.

2. A refrigerator with a compressor motor for driving coolant to reduce the temperature in the refrigerator, a predetermined crisper drawer for maintenance of food stuffs sensitive to oxygen levels, a switch to detect the closure of the predetermined crisper drawer, and a nitrogen concentration system connected to the crisper drawer and the switch to produce nitrogen-enriched and oxygen-depleted air to increase the life of the oxygen-sensitive food.

* * * * *